United States Patent Office 3,582,501
Patented June 1, 1971

3,582,501
POLYURETHANE FOAMS AND PROCESS OF MAKING THEM
Fritz Hostettler and Eugene F. Cox, Charleston, W. Va., assignors to Union Carbide Corporation
No Drawing. Continuation-in-part of application Ser. No. 686,009, Sept. 25, 1957. This application Nov. 21, 1958, Ser. No. 775,390
The portion of the term of the patent subsequent to July 9, 1985, has been disclaimed
Int. Cl. C08g 22/04
U.S. Cl. 260—2.5                 24 Claims

ABSTRACT OF THE DISCLOSURE

This invention relates to the acceleration of reactions between compounds having a reactive group of the formula —N=C=Y, in which Y is oxygen or sulfur, with active hydrogen-containing compounds by the addition of a catalyst composition comprising a tertiary amine and an organo tin compound having at least one direct carbon to tin bond.

---

The present invention relates to methods for accelerating reactions of compounds having a reactive group of the formula —N=C=Y, in which Y is oxygen or sulfur, with active hydrogen-containing compounds as determined by the Zerewitinoff method described in J. Am. Chem. Soc., vol. 49, page 3181 (1927). The methods of the invention are broadly useful in promoting reactions of isocyanates and isothiocyanates with a wide variety of active hydrogen containing compounds and have found particular and immediate applicability in the preparation of polyurethanes, a class of organic polymeric materials formed by the reaction of polyfunctional compounds containing active-hydrogen atoms and polyisocyanates and polyisothiocyanates which are useful in the manufacture of gum stocks, elastomeric materials and the like.

A considerable number of materials have heretofore been proposed as catalysts for accelerating isocyanate reactions generally and polyurethane preparations in particular. Tertiary amines have received considerable attention as catalysts of merit but a disadvantage entailed in their use is the excessive amount which must necessarily be employed in order to achieve satisfactory reaction rates. In our copending application, U.S. Ser. No. 686,031, filed Sept. 25, 1957, now U.S. Pat. No. 3,392,153, there are disclosed certain catalysts which are ideally suited for accelerating reactions of organic compounds having one or more —N=C=Y groups in which Y is oxygen or sulfur with compounds having groups containing active hydrogen atoms. Reaction rates that are obtainable in accordance with the methods disclosed therein are up to many thousand times the rates achieved with the last catalysts than theretofore proposed.

We have now discovered quite unexpectedly that catalyst compositions comprising organo tin compounds characterized by the presence therein of at least one direct carbon to tin bond and tertiary amines are particularly adapted for use in accelerating the reaction between isocyanates or isothiocyanates and compounds having groups containing active hydrogen atoms. As has been pointed out in our copending application mentioned supra the reaction rates obtainable employing the tin catalysts alone are up to many thousand times the rates achievable with tertiary amine catalyst. It has been observed that catalyst compositions of the present invention apparently exert a synergistic effect since the reaction rates that are obtainable in accordance with the methods of the present invention are of the order of from about two to about seven times the best reaction rate of the tin catalyst when employed as the sole catalyst for the reaction.

One of the important reactions in polyurethane chemistry is urethane linkage formation. This reaction is the polymerization reaction between isocyanates and polyethers or polyesters to provide the polyether-polyurethane or polyester-polyurethane:

$$-NCO + -R-OH \longrightarrow -NH-\overset{O}{\underset{\|}{C}}-OR$$
(urethane)

The ability of representative compositions comprising an organo-tin compound having at least one direct carbon to tin bond and tertiary amines to catalyze isocyanate reactions yielding the urethane linkage or structure is vividly demonstrated by reacting phenyl isocyanate and n-butanol under carefully controlled conditions. The tests were carried out in each instance by admixing equimolar

TABLE I.—REACTION OF PHENYL ISOCYANATE WITH 1-BUTANOL IN DIOXANE AT 70° C.

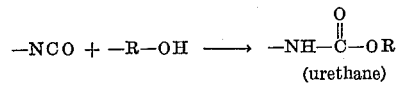

$$C_6H_5NCO + C_4H_9OH \xrightarrow[70°C.]{C_4H_8O_2} C_6H_5NHCOOC_4H_9$$
ca. 0.25 M    0.25 M

| Tin catalyst | Mol percent of tin catalyst | Amine catalyst | Mol percent of amine catalyst | Relative rate |
|---|---|---|---|---|
| Dibutyltin diacetate | 0.0099 | | | 540 |
| Do | 0.00197 | | | 110 |
| Do | 0.00105 | | | 59 |
| Do | 0.0005 | | | <38 |
| Do | 0.000198 | | | 16 |
| | | Triethylamine | 9.1 | 70 |
| | | do | 0.88 | 6.7 |
| Dibutyltin diacetate | 0.00098 | do | 1.00 | 250 |
| Do | 0.00098 | do | 0.096 | 200 |
| Do | 0.00098 | do | 0.0096 | 180 |
| Do | 0.00099 | do | 0.0009 | 120 |
| Do | 0.00051 | do | 1.01 | 43 |
| Do | 0.000199 | do | 10.1 | 110 |
| Dioctyltin oxide | 0.00108 | | | 38 |
| Do | 0.00108 | Triethylamine | 1.05 | 90 |
| Dimethyltin dichloride | 0.00121 | | | 94 |
| Do | 0.00121 | Triethylamine | 0.103 | 380 |
| Dibutyltin dichloride | 0.00091 | | | 47 |
| Do | 0.00091 | Triethylamine | 0.103 | 190 |
| Tetrabutyltin | 1.00 | | | 160 |
| Do | 1.00 | Triethylamine | 1.05 | 310 |
| | | n-Methylmorpholine | 10.1 | 29 |
| Dibutyltin diacetate | 0.00098 | do | 10.1 | 210 |
| | | 1,4-diaza-bicyclo[2,2,2]octane | 0.95 | 110 |
| Dibutyltin diacetate | 0.00098 | do | 1.03 | 350 |
| Without catalyst | | | | 1.0 | amounts of phenyl isocyanate and n-butanol in dioxane as a solvent, adding a different catalyst to each mixture and observing the rate of reaction at 70° C. The reaction, catalysts and relative rates based on mol percentage of catalyst per mol of isocyanate are as indicated immediately below in Table I:

Another very important reaction in polyurethane chemistry is the formation of the urea linkage by the reaction of isocyanates and water:

$$2NCO + H_2O \longrightarrow -NH-\overset{\overset{O}{\|}}{C}-NH- + CO_2\uparrow$$
$$\text{urea}$$

The isocyanate residues are linked together by the urea linkages $$(-NH-\overset{\overset{O}{\|}}{C}-NH-)$$

and the carbon dioxide gas formed produces an expanded material. The ability of representative catalyst compositions of the present invention to accelerate isocyanate reactions to yield the urea linkage is demonstrated by reacting phenyl isocyanate and water in dioxane at 70° C. The reaction, catalyst and combinations thereof and relative rates based on the mol percentage of catalyst are indicated immediately below in Table II:

TABLE II.—REACTION OF PHENYL ISOCYANATE WITH WATER IN DIOXANE AT 70° C.

$$2C_6H_5NCO + H_2O \xrightarrow[70°\,C.]{C_4H_8O_2} C_6H_5NH\overset{\overset{O}{\|}}{C}NHC_6H_5 + CO_2$$
ca. 0.25M   0.125M

| Tin catalyst | Mol percent of tin catalyst | Amine catalyst | Mol percent of amine catalyst | Relative rate |
|---|---|---|---|---|
| Dibutyltin diacetate | 0.00101 | | | 79 |
| Do | 0.0099 | | | 26 |
| | | Triethylamine | 9.80 | 34 |
| Do | 0.0098 | do | 0.96 | 90 |
| Without catalyst | | | | 1.0 |

Still another very important reaction in polyurethane chemistry is the formation of the biuret linkage by the reaction of isocyanates and the urea linkage as illustrated by the reaction of the isocyanates and diphenylurea:

$$-NCO + C_6H_5NH\overset{\overset{O}{\|}}{C}NHC_6H_5 \longrightarrow -NHCO\underset{\underset{C_6H_5}{|}}{N}CONHC_6H_5$$

The ability of representative catalyst compositions of the present invention to accelerate isocyanate reactions to yield the biuret linkage is demonstrated by reacting phenyl isocyanate and symmetrical diphenylurea in dioxane at 70° C. The reaction, catalysts and combinations thereof and relative rates based on the mol percentages of catalyst are as indicated immediately below in Table III:

TABLE III.—REACTION OF PHENYL ISOCYANATE WITH SYM. DIPHENYLUREA IN DIOXANE AT 70° C.

$$C_6H_5NCO + C_6H_5NH\overset{\overset{O}{\|}}{C}NHC_6H_5 \xrightarrow[70°\,C.]{C_4H_8O_2} C_6H_5NH\overset{\overset{O}{\|}}{C}\underset{\underset{C_6H_5}{|}}{N}\overset{\overset{O}{\|}}{C}NHC_6H$$
ca. 0.05M   ca. 0.05M

| Tin catalyst | Mol percent of tin catalyst | Amine catalyst | Mol percent of amine catalyst | Relative rate |
|---|---|---|---|---|
| Dibutyltin diacetate | 0.057 | | | 43 |
| Do | 0.099 | | | 56 |
| Do | 0.166 | | | 76 |
| Do | 0.41 | | | 240 |
| Do | 0.80 | | | 420 |
| | | Triethylamine | 10.0 | 1.9 |
| Do | 0.057 | do | 0.73 | 95 |
| Do | 0.017 | do | 0.73 | 55 |
| Without catalyst | | | | 1.0 |

The foregoing data illustrate the remarkable high catalytic activity of the combinations comprising organo tin compounds characterized by the presence therein of at least one direct carbon to tin bonl and tertiary amines. The reactions accelerated were chosen to provide accurate means for comparison of reaction rates under carefully controlled conditions and to serve as a guide to the magnitude of "catalytic amounts" involved without in any sense being considered limitative of the scope of the invention.

The molar concentrations of the ingredients of the catalyst compositions can be varied over a wide range since the molar concentrations of the respective ingredients is not necessarily a critical feature of the invention. Molar concentration ratios of tin to amine can be varied from 100:1 to 1:10,000 although molar concentrations above and below the above recommended ratios can be employed if desired.

Among the many types of organo tin compounds characterized by the presence therein of a direct carbon to tin bond, of which specific representative compounds have been tested as candidates for the catalyst compositions useful in the methods of this invention and shown to be active, are:

(A) Tin compounds having four carbon to tin bonds and no intensifying bonds such as tetramethyltin, tetraethyltin, tetrapropyltin, tetrabutyltin, tetraoctyltin, tetralauryltin, tetrabenzyltin, tetrakis(2-phenylethyl)tin, tetraphenyltin, tetra-para-tolyltin, tetravinyltin, tetraallyltin, tetrakis(chloromethyl)tin, tetramethylsulfonylmethyltin, tetra-para-methoxyphenyltin, tetra-para-nitrophenyltin, as well as unsymmetrical compounds as exemplified by 2-cyanoethyltributyltin, dibutyldiphenyltin and various addition products of alkyl, aryl and aralkyltin hydrides with unsaturated organic compounds such as acrylonitrile, allyl cyanide, crotononitrile, acrylamide, methyl acrylate, allyl alcohol, acrolein diethyl acetal, vinyl acetate, styrene, etc.

(B) Tin compounds having n carbon to tin bonds and 4–n intensifying bonds from tin to halogen or hydrogen atoms or hydroxyl groups in which n is an integer from 1 to 3, such as trimethyltin chloride, tributyltin chloride, trioctyltin chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibuyltin dichloride, dioctyltin dichloride, bis(2-phenylethyl)tin dichloride, diphenyltin dichloride, divinyltin dichloride, diallyltin dibromide, diallyltin diiodide, dibutyltin difluoride, bis(carboethoxymethyl)tin diiodide, bis(carbomethoxyethyl)tindichloride, dibutyltin dihydride, butyltin trichloride and octyltin trichloride.

(C) Tin compounds having two carbon to tin bonds and a catalytically intensifying double bond from tin to oxygen or sulfur, such as dimethyltin oxide, diethyltin oxide, dibutyltin oxide, dioctyltin oxide, dilauryltin oxide, diphenyltin oxide and diallylytin oxide, all prepared by hydrolysis of the corresponding dihalides, as well as bis(2-phenylethyl)tin oxide, [HOOC(CH$_2$)$_5$]$_2$SnO, [CH$_3$OCH$_2$(CH$_2$OCH$_2$)$_{x-1}$CH$_2$]$_2$SnO, [CH$_3$OCH$_2$(CH$_2$OCH$_2$)$_{x-1}$CH$_2$O(CH$_2$)$_5$]$_2$SnO and dibutyltin sulfide, the x's being whole integers.

(D) Tin compounds having n carbon to tin bonds and 4–n intensifying bonds from tin to oxygen, sulfur, nitrogen or phosphorous linking organic radicals, n being an integer from 1 to 3, such as tributyltin methoxide, tributyltin butoxide, tributyltin acetate, tributyltin N-piperazinylthiocarbonylmercaptide, tributyltin phosphorous dibutoxide prepared as indicated immediately below:

$$2(C_4H_9O)_3P + PCl_3 \longrightarrow 3(C_4H_9O)_2PCl$$

$$(C_4H_9)_3SnCl + 2Na \longrightarrow (C_4H_9)_3SnNa + NaCl$$

$$(C_4H_9)_3SnNa + (C_4H_9O)_2PCl \xrightarrow{NH_3} (C_4H_9)_3SnP(OC_4H_9)_2 + NaCl$$

dibutylthin dibutoxide, $$(C_4H_9)_2Sn[OCH_2(CH_2OCH_2)_{x-1}CH_2CH_3]_2$$

dibutyl bis(O-acetylacetonyl)tin, dibutyltin bis(octyl maleate), "Advastab T–50–LT" (a dibutyltin compound found, upon analysis to contain two ester groups containing carbon, hydrogen and oxygen), "Advastab 17M" (a dibutyltin compound found, upon analysis to contain an octyl ester of thioacetic connected to tin through sulfur), Argus Mark A and Thermolite 20 (two trade names for dibutyltin bis(thiododecoxide)), dibutyltin bis(octyl thioglycolate), dibutyltin bis(N-morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinylthiocarbonylmercaptide), dioctyltin bis(N-piperazinylthiocarbonylmercaptide), octyltin tris(thiobutoxide), butyltin triacetate, methylstannonic acid, ethylstannonic acid, butylstannonic acid, octylstannonic acid, $$HOOC(CH_2)_5\text{—}SnOOH$$

$$(CH_3)_3N^\oplus(CH_2)_5SnOOH$$

$$CH_3OCH_2(CH_2OCH_2)_{x-1}CH_2SnOOH$$

and $$(CH_3OCH_2(CH_2OCH_2)_{x-1}CH_2O(CH_2)_5SnOOH$$

in which the $x$'s are positive integers.

(E) Polystannic compounds having carbon to tin bonds and preferably also intensifying bonds from tin to halogen, hydrogen, oxygen, sulfur, nitrogen or phosphorous, such as $HOOSn(CH_2)_xSnOOH$ and $$HOOSnCH_2(CH_2OCH_2)_xCH_2SnOOH$$

the $x$'s being positive integers, bis-trimethyltin, bis-triphenyltin, bis(tributyltin) oxide, dibutyltin basic laurate, dibutyltin basic hexoxide and other polymeric organo-tin compounds containing carbon to tin bonds and preferably also intensifying bonds, e.g., those having repeating $$\begin{array}{c}R\\|\\-SnO-\\|\\R\end{array}$$

groups, dimers and trimers of $(R_2SnY)_n$ and the like in which the R's may be alkyl, aryl or aralkyl radicals and the Y's are chalcogens, as well as many other organo-tin compounds heretofore proposed as heat and light stabilizers for chlorinated polymers and available under such trade names as "Advastab," "Nuostabe," and "Thermolite."

The tertiary amines which are useful as components of the catalyst compositions suitable for use in the methods of the invention include tertiary amines substantially unreactive with isocyanate groups and tertiary amines containing active hydrogen atoms reactive with isocyanate groups. Typical tertiary amines which are substantially unreactive with isocyanate groups include triethylamine, tributylamine, trioctylamine, N-methylmorpholine, N-ethylmorpholine, N-octadecylmorpholine (N-cocomorpholine), N-methyldiethanolamine, N,N-dimethylethanolamine, N,N'-bis(2-hydroxypropyl)piperazine, N,N,N',N'-tetramethylethylenediamine, N,N,N',N' - tetramethyl-1,3-propanediamine, triethylenediamine (1,4-diazabicyclo-[2,2,2]octane), 1,4-bis(2-hydroxypropyl)-2-methylpiperazine, N,N-dimethylbenzylamine, N,N-dimethylcyclohexylamine, benzyltriethylammonium, bromide, bis((N,N-diethylaminoethyl) adipate, N,N-diethylbenzylamine, N-ethylhexamethyleneamine, N-ethylpiperidine, alpha-methylbenzyldimethylamine, dimethylhexadecylamine, 3-methylisoquinoline, dimethylcetylamine, and isocyanates and organometallic tin compounds containing tertiary nitrogen atoms.

Typical tertiary amines containing active hydrogen atoms reactive with isocyanate groups include triethanolamine, triisopropanolamine, N-methyldiethanolamine, N-ethyldiethanolamine, polyoxyalkylene polyol polymers and copolymers of alkylene oxides, such as propylene oxide, ethylene oxide, homopolymers, copolymers and mixtures thereof started with triethanolamine, triisopropanolamine, ethylenediamine, ethanolamine, diethylenetriamine and the like. Still other tertiary amines containing active hydrogen atoms reactive with isocyanate groups include polyesters based on polyols such as illustrated above including triethanolamine, triisopropanolamine, N-alkyl diethanolamines and the like as well as polycarboxylic acids containing tertiary nitrogen atoms.

The active-hydrogen containing polymeric materials include polyesters, polyethers, polyesterether and polyesteramides.

Polyethers which can be employed in conjunction with the curing compositions of the invention include linear and branched polyethers having at least one and preferably a plurality of ether linkages and containing at least two hydroxyl groups and being substantially free from functional groups other than hydroxyl. Preferred polyethers are the polyoxyalkylene polyols. Among the polyoxyalkylene polyols which are useful in the practice of this invention are the polyethylene glycols having average molecular weights of 200, 400 and 600 and the polypropylene glycols having average molecular weights of 400, 750, 1200 and 2000. Polymers and copolymers of polyoxyalkylene polyols are also adaptable in the process of this invention as well as the block copolymers of ethylene and propylene oxide. Among the copolymers of polyoxyalkylene polyols, and particularly propylene oxide, that deserve some special mention are the propylene oxide adducts of ethylene glycol, glycerol, 1,2,6-hexanetriol, trimethylolpropane, trimethylolethane, pentaerythritol, sorbitol, tris(hydroxyphenylpropane), triethanolamine, triisopropanolamine, ethylenediamine, diethylenetriamine and ethanolamine, more fully described hereinafter. Linear and branched copolyethers of ethylene oxide and propylene oxide have also been found to be useful in making the foamed products of this invention. Preferred copolymers of propylene oxide and ethylene oxide are those containing 10 percent ethylene oxide in molecular weights of 500, 2000, 3000 and 4000.

Further useful types of polyethers are block copolymers prepared from propylene oxide and ethylene oxide. These polyethers can be characterized by reference to the following general formula:

$$H(O\text{—}CH_2\text{—}CH_2)_x\left(O\text{—}CH\text{—}\underset{CH_3}{\overset{}{CH_2}}\right)_y(O\text{—}CH_2\text{—}CH_2)_zOH \quad I$$

and $$\begin{array}{c}H(O\text{—}CH_2\text{—}CH_2)_a(O\text{—}CH\text{—}CH_2)_b\\\diagdown\\ \quad N\text{—}CH_2\text{—}CH_2\text{—}\\\diagup\\H(O\text{—}CH_2\text{—}CH_2)_a(O\text{—}CH\text{—}CH_2)_b\\|\\CH_3\end{array}$$

$$N\begin{cases}(CH_2\text{—}CH\text{—}O)_b(CH_2\text{—}CH_2\text{—}O)_aH\\\\(CH_2\text{—}CH\text{—}O)_b(CH_2\text{—}CH_2\text{—}O)_aH\\|\\CH_3\end{cases} \quad II$$

wherein Formula I subscripts, $x$, $y$ and $z$, represent positive integers in the range of from 2 to 100 and the subscripts $a$ and $b$ of Formula II represent positive integers in the range of from 1 to 200.

Polyethers having a highly branched chain network are also useful. Such highly branched chain polyethers are readily prepared from alkylene oxides of the type above described and initiators having a functionality greater than two. Highly branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer.

The higher functional initiators that are useful with the alkylene oxides, described above, include polyols, polyamines and amino alcohols having a total of three or more reactive hydrogen atoms on hydroxyl and primary or secondary amino groups. Suitable polyols include triols, such as glycerol, trimethylolpropane, butanetriols, hexanetriols, trimethylolphenol, tris(hydroxyphenyl)propane, tris(hydroxyxylyl)propane, novalaks, trialkanolamines, various tetrols, such as erythritol and pentaerythritol; pentols; hexols, such as dipentaerythritol and sorbitol, as well as alkyl glucosides, carbohydrates, polyhydroxy fatty acid esters, such as castor oil and polyoxy alkylated derivatives or polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, triisopropanolamine, 2-(2-amino-ethylamino)ethanol, 2 - amine - 2 - (hydroxymethyl)-1,3-propanediol, diethylenetriamine, triethylenetetramine, urea and urea-formaldehyde polymers as well as various aryl polyamines, such as 4,4′,4″-methylidynetrianiline.

Another means of increasing the degree of branching, if desired, when employing linear polyethers, is to include a highly functional initiator, as described above, in the mixture charged to the reaction.

Preferred polyethers of the branched type are those prepared by adding propylene oxide to various diols, triols, tetrols and polyols as starters to produce adducts of various molecular weights. Polyethers which deserve special mention are the 1,2,6-hexanetriol and glycerol adducts of propylene oxide having molecular weights of 250, 500, 700, 1500, 2500, 3000 and 4000.

The amount of highly functional initiator normally employed with the linear type polyethers described above is an amount in the range of from 0.5 to 6.0 percent by weight of said initiator based on the weight of polyether charged to the reaction.

Generally, the polyethers suitable for employment can be conveniently characterized as normally liquid (although meltable solid polyethers are not excluded), pourable polyethers having viscosities in the range of from 50 centipoises to about 500,000 centipoises at room temperature (i.e., 25° C.) and having preferably molecular weights in the range of from 200 to about 10,000. When employing polyethers having molecular weights in the range above described, it is readily apparent that foams can be prepared which are tailor-made to the requirements of specific applications. For example, where maximum flexibility of the foamed polymer is a primary requirement, the polyether should, for optimum results, have a molecular weight of approximately 1500–7000, if it is a branched type polyether and somewhat less, about 1000–2000, if it is a substantially linear type polyether. While it has not been definitely established for semi-rigid foams, the molecular weight of branched polyethers should be in the range of from 700 to about 1500 and of linear polyethers in the range of from 250–1000. When it is desired to produce a rigid foam, the molecular weight of the starting polyether should be in the range of from 250–1,000 if the polyether is branched; if linear, the molecular weight of the polyether should be somewhat less, that is, about 200–500.

The polyesters and polyesteramides are formed from polyfunctional materials, such as polycarboxylic acids, aminocarboxylic acids, glycols, aminoalcohols, diamines and the like. The polyesters are readily prepared by reacting at least two bifunctional ingredients; a glycol and a dibasic acid. The polyesteramides are readily prepared by reacting a dibasic acid with a mixture comprising a major amount of a glycol and a minor amount of an amino alcohol or a diamine. Additionally, a wide variety of complex polyesters and polyesteramides can be formed by the reaction of a plurality of acids, glycols, amino alcohol and polyamines.

Representative polyesters and polyesteramides which have utility include polyesters and polyesteramides prepared from ethylene glycol and adipic acid; propylene glycol and adipic acid; ethylene glycol (80 mol percent), propylene glycol (20 mol percent) and adipic acid; ethylene glycol (80 mol percent), propylene glycol 1,2 (20 mol percent) and azelaic acid; ethylene glycol (80 mol percent), propylene glycol 1,2 (20 mol percent) and sebacic acid; ethylene glycol (80 mol percent), propylene glycol 1,2 (20 mol percent) and dilinoleic acid (20 mol percent); adipic acid (80 mol percent); ethylene glycol (80 mol percent), glycerine monoethyl ether (20 mol percent) and adipic acid; ethylene glycol (80 mol percent), butylene glycol 1,4 (20 mol percent) and adipic acid; ethylene glycol (80 mol percent), propylene glycol 1,3 (20 mol percent) and adipic acid; ethylene glycol (80 mol percent), pentane diol 1,4 (20 mol percent) and adipic acid; ethylene glycol (80 mol percent), glycerine monoisopropyl ether (20 mol percent) and adipic acid; ethylene glycol (80 mol percent), propylene glycol 1,2 (from 18 to 5 mol percent), ethanolamine (from 2 to 15 mol percent) and adipic acid; ethylene glycol (80 mol percent), propylene glycol 1,2 (20 mol percent) and maleic acid (from 3 to 6 mol percent), adipic acid (from 97 to 94 mol percent); ethylene glycol (80 mol percent), propylene glycol 1,2 (from 19 to 17 mol percent), piperazine (from 1 to 3 mol percent) and adipic acid; ethylene glycol (80 mol percent), propylene glycol 1,2 (from 18 to 5 mol percent), dihydroxyethyl aniline (from 2 to 15 mol percent) and adipic acid; ethylene glycol (80 mol percent), butylene glycol 1,4 (20 mol percent) and adipic acid; ethylene glycol (80 mol percent), diethylene glycol (20 mol percent) and adipic acid; ethylene glycol (from 90 to 10 mol percent), propylene glycol 1,2 (from 10 to 90 mol percent) and adipic acid; ethylene glycol (from 90 to 10 mol percent), propylene glycol 1,2 (from 10 to 90 mol percent) and azelaic acid.

The organic polyisocyanates and polyisothiocyanates which can be employed with utility are those of the general formula:

$$R(NCY)_x$$

in which $x$ is two or more and R can be alkylene, substituted alkylene, arylene, substituted arylene, a hydrocarbon or substituted hydrocarbon containing one or more aryl—NCY bonds and one or more alkyl—NCY bonds, a hydrocarbon or substituted hydrocarbon containing a plurality of either aryl—NCY or alkyl—NCY bonds. R can also include radicals such as —R—Z—R— where Z may be any divalent moiety such as —O—, —O—R—O—, —CO—, —CO$_2$—, —S—, —S—R—S—, —SO$_2$—, etc. Examples of such compounds include hexamethylene diisocyanate, 1,8-diisocyanato-p-menthane, xylylene diisocyanates, (OCNCH$_2$CH$_2$CH$_2$OCH$_2$)$_2$, 1-methyl-2,4-diisocyanatocyclohexane, phenylene diisocyanates, tolylene diisocyanates, chlorophenylene diisocyanates, diphenylmethane-4,4′-diisocyanate, naphthalene - 1,5 - diisocyanate, triphenylmethane-4,4′,4″-triisocyanate, xylylene-alpha,alpha′ - diisothiocyanate, and isopropylbenzene-alpha,4-diisocyanate.

Further included are dimers and trimers of isocyanates and polymeric diisocyanates of the general formulae:

$$(RNCY)_x \text{ and } [R(NCY)_x]_y$$

in which $x$ and $y$ are two or more, as well as compounds of the general formula:

$$M(NCY)_x$$

in which $x$ is one or more and M is a monofunctional or polyfunctional atom or group. Examples of this type include ethylphosphonic diisocyanate, $C_2H_5P(O)(NCO)_2$; phenylphosphonous diisocyanate, $C_6H_5P(NCO)_2$; compounds containing a =Si—NCY group and isocyanates derived from sulfonamides [$R(SO_2NCO)_2$].

The methods of the invention can be carried out continuously or by batch process. A particular embodiment of the invention includes methods for producing, batchwise or continuously, polyurethanes suitable for the manufacture of foams by the so-called "prepolymer" and "semi or quasi prepolymer" techniques. Briefly, the "prepolymer" technique comprises reacting a compound containing at least two active hydrogen atoms and a polyisocyanate in the presence of the catalyst compositions herein disclosed in such proportions as to produce a liquid product which requires only the addition of water and catalyst to give a complete foam. In the "semi or quasi prepolymer" technique, the active hydrogen containing compound is reacted with a large excess of polyisocyanate to produce a liquid product of relatively low viscosity and a high isocyanate content. This "semi prepolymer" must be further reacted with additional active hydrogen containing compound or compounds, water and catalyst to produce a foam.

The following examples will serve to illustrate the practice of the invention:

EXAMPLE 1

A recipe was prepared comprising:

(a) 75 grams of a polyester containing 0.05 percent of dibutyltin oxide, prepared by reacting 10.2 grams of pentaerythritol, 490 grams of mixed methyl-epsilon-caprolactones, and 0.25 gram of dibutyltin oxide at 170° C. for 7 hours, and having a molecular weight of 6460.

(b) 26 grams of 2,4-tolylene diisocyanate containing 0.15 percent "Ethocel" [1].

(c) 2 grams of emulsifier.

(d) 2 grams of N-methylmorpholine.

The above ingredients were mixed at room temperature and allowed to react for 13 minutes, whereupon 2.2 grams of water were added to the mix and the mixture was allowed to foam in an open mold. The resulting foam cured rapidly and possessed the following physical properties:

| | |
|---|---|
| Density, lbs./cu. ft. | 2.50 |
| Tensile strength, p.s.i. | 20 |
| Compression load at 10% deflection, p.s.i. | 0.41 |
| Compression load at 50% deflection, p.s.i. | 0.99 |

[1] An ethoxylated cellulose having an average ethoxy content of 47.5–49 percent. A 5 percent solution of the product in eighty parts of toluene and twenty parts of absolute ethanol has a viscosity of 100 centipoises at 25° C.

EXAMPLE 2

A recipe was prepared comprising:

(a) 100 grams of a polyester-ether, prepared by reacting 15.5 grams of ethylene glycol, 150 grams of epsilon-caprolactone, 350 grams of ethylene oxide and 0.25 ml. of boron trifluoride ethyl etherate, having a molecular weight of 2200.

(b) 50 grams of a 65:35 mixture of 2,4 and 2,6 tolylene diisocyanate containing 0.5 percent of "Ethocel."

(c) 3.1 grams of water.

(d) 0.75 gram of dioctyltin oxide.

(e) 0.20 gram of N-methylmorpholine.

As soon as the mixture began to foam it was transferred to an open mold. The resulting foam volume was excellent, foam rise time and cure time were surprisingly good. The resulting foam had the following physical properties:

| | |
|---|---|
| Density, lbs./cu. ft. | 2.04 |
| Tensile strength, p.s.i. | 16 |
| Compression load at 50% deflection, p.s.i. | 0.80 |

EXAMPLE 3

A recipe was prepared comprising:

(a) 100 grams of a polyester ether, prepared by reacting 15.5 grams of ethylene glycol, 200 grams of epsilon-caprolactone, 306 grams of ethylene oxide, 0.25 ml. of boron trifluoride ethyl etherate, having a molecular weight of 2180.

(b) 40 grams of a 65:35 mixture of 2,4 and 2,6 tolylene diisocyanate containing 0.5 percent "Ethocel."

(c) 3.1 grams of water.

(d) 0.75 gram of dioctyltin oxide.

(e) 0.20 gram of N-methylmorpholine.

As soon as the mixture began to foam, it was transferred to an open mold. The resulting foam volume was very good, and foam rise time and cure time were surprisingly good. The resulting foam has the following physical properties:

| | |
|---|---|
| Density, lbs./cu. ft. | 1.74 |
| Tensile strength, p.s.i. | 8 |
| Compression load at 50% deflection, p.s.i. | 0.54 |

EXAMPLE 4

A recipe was prepared comprising:

(a) 100 grams of a polyester ether, prepared by reacting 15.5 grams of ethylene glycol, 225 grams epsilon-caprolactone, 275 grams of ethylene oxide, and 0.5 ml. of boron trifluoride ethyl etherate, having a molecular weight of 1720.

(b) 42 grams of a 65:35 mixture of 2,4 and 2,6 tolylene diisocyanate containing 0.5 percent of "Ethocel."

(c) 3.1 grams of water.

(d) 0.75 gram of diotyltin oxide.

(e) 0.4 gram of N-methylmorpholine.

As soon as the mixture began to foam it was transferred to an open mold. The resulting foam volume was very good, and foam rise time and cure time were surprisngly good. The resulting foam has the following physical properties:

| | |
|---|---|
| Density, lbs./cu. ft. | 1.94 |
| Tensile strength, p.s.i. | 17 |
| Compression load at 50% deflection, p.s.i. | 0.80 |

EXAMPLE 5

A recipe was prepared comprising:

(a) 75 grams of polypropylene glycol having a molecular weight of 1900, and 75 grams of a reaction product of propylene oxide and 1,2,6-hexanetriol, having a molecular weight of 2620.

(b) 54 grams of 80:20 mixture of 2,4 and 2,6 tolylene diisocyanate.

(c) 3.75 grams of water.

(d) 0.9 gram of a emulsifier.

(e) 0.5 gram of triethylamine.

(f) 0.8 gram of dibutyltin dilaurate.

The above mixture was foamed by the one-shot method. The resulting foaming mixture rose faster than foams usually prepared with dibutyltin dilaurate as only catalyst. The cure was much improved over that observed with tin catalyst as the single catalyst system.

The above experiment was repeated except that 0.9 gram of dibutyltin dilaurate and 0.3 gram of triethylamine were employed. The resulting foam exhibited much improved foam rise time and cure.

EXAMPLE 6

A recipe was prepared comprising:

(a) 112.5 grams of polypropylene glycol having a molecular weight of 1900, a hydroxyl number of 58.5, a carboxyl number of 0.15 and containing 0.13 percent water and 37.5 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash, percent | .25 |
| Average molecular weight | 3629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meg./gm. | .015 |

(b) 50.5 grams of an 80:20 mixture of 2,4- and 2,6-isomers of tolylene diisocyanate.
(c) 3.75 grams of water.
(d) 0.6 gram of dibutyltin dilaurate.
(e) 0.9 gram of an emulsifier.

The above-described mixture was thoroughly mixed and transferred to an open mold as soon as it started foaming. The foamed mixture cured in a matter of minutes and was characterized by the following physical properties:

| | |
|---|---|
| Density, lbs./ft. | 2.57 |
| Tensile strength, p.s.i. | 13.0 |
| Compression load at 25% deflection, p.s.i. | 0.354 |
| Compression load at 50% deflection, p.s.i. | 0.465 |

The above example illustrates the use of a tertiary amine which contains active hydrogen atoms reactive with isocyanate groups.

EXAMPLE 7

A recipe was prepared comprising:
(a) 100 grams of polypropylene glycol having a molecular weight of 1900, a hydroxyl number of 58.5, a carboxyl number of 0.15 and containing 0.13 percent water and 50 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash percent | .25 |
| Average molecular weight | 3629 |
| Hydroxyl number | 61.8 |
| Acid number | Nil |
| Gel Test, seconds | 6 |
| pH 10:1 aqueous isopropanol | 9.10 |
| pH 10:6 aqueous isopropanol | 9.55 |
| Color, Gardner | 3.5 |
| Unsaturation, meg./gm. | .015 |

(b) 50.5 grams of an 80:20 mixture of 2,4- and 2,6-isomers of tolylene diisocyanate.
(c) 3.75 grams of water.
(d) 0.7 gram of dibutyltin dilaurate.
(e) 1.0 gram of an emulsifier The above-described mixture was thoroughly mixed and transferred to an open mold as soon as it started foaming. The foamed mixture cured in a matter of minutes and was characterized by the following physical properties:

| | |
|---|---|
| Density, lbs./ft. | 2.74 |
| Tensile strength, p.s.i. | 12.0 |
| Compression load at 25% deflection, p.s.i. | 0.465 |
| Compression load at 50% deflection, p.s.i. | 0.615 |

The above example also illustrates the use of a tertiary amine which contains active hydrogen atoms reactive with isocyanate groups.

EXAMPLE 8

A recipe was prepared comprising:
(a) 100 grams of polypropylene glycol having a molecular weight of 1900, a hydroxyl number of 58.5, a carboxyl number of 0.15 and containing 0.13 percent water and 50 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash percent | .25 |
| Average molecular weight | 3629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meg./gm. | .015 |

(b) 58 grams of an 80:20 mixture of 2,4- and 2,6-isomers of tolylene diisocyanate.
(c) 3.75 grams of water.
(d) 0.6 gram of dibutyltin dilaurate.
(e) 0.9 gram of an emulsifier The above-described mixture was thoroughly mixed and transferred to an open mold as soon as it started foaming. The foamed mixture cured in a matter of minutes and was characterized by the following physical properties:

| | |
|---|---|
| Density, lbs./cu. ft. | 2.32 |
| Tensile strength, p.s.i. | 10.0 |
| Compression load at 25% deflection, p.s.i. | 0.459 |
| Compression load at 50% deflection, p.s.i. | 0.583 |

The above example also illustrates the use of a tertiary amine which contains active hydrogen atoms reactive with isocyanate groups.

EXAMPLE 9

A recipe was prepared comprising:
(a) 150 grams of a polyether prepared by reacting propylene oxide and triisopropanolamine, and having a molecular weight of 2850.
(b) 50 grams of 80:20 mixture of 2,4- and 2,6-diisocyanate.
(c) 3.75 grams of water.
(d) 0.7 gram of dibutyltin dilaurate.
(e) 0.7 gram of an emulsifier.

The above described mixture was thoroughly mixed and transferred to an open mold as soon as it started foaming. The foamed mixture cured in a matter of minutes and was characterized by the following physical properties:

| | |
|---|---|
| Density, lbs./ft. | 3.06 |
| Tensile strength, p.s.i. | 15 |
| Compression set, percent | 9.9 |
| Compression load at 25% deflection, p.s.i. | 0.765 |
| Compression load at 50% deflection, p.s.i. | 1.02 |

The above example is a further illustration of the use of a tertiary amine which contains active hydrogen atoms reactive with isocyanate groups.

EXAMPLE 10

A recipe was prepared comprising:

(a) 213 grams of polypropylene glycol having a molecular weight of 2010 and 213 grams of a reaction product of glycerol and propylene oxide and having a molecular weight of 2990.
(b) 155 grams of an 80:20 mixture of 2,4 and 2,6 tolylene diisocyanate.
(c) 3.6 grams of an emulsifier.
(d) 3.0 grams of dibutyltin dilaurate.

A variety of tertiary amines at different concentrations were added to the above recipe, and their effect on the time of foam rise was observed.

|  | Amount, gms. | Foam rise time, sec. |
|---|---|---|
| Triethylamine | 0.3 | 133 |
| Do | 0.6 | 120 |
| Do | 1.2 | 100 |
| N,N-dimethylbenzylamine | .90 | 127 |
| Do | 1.50 | 118 |
| Do | 2.10 | 110 |
| N,N,N',N'-tetramethyl-1,3-butane diamine | 0.15 | 134 |
| Do | 0.30 | 116 |
| Do | 0.60 | 92 |
| None |  | 202 |

The above foam rise times clearly illustrate the efficiency of the tin-amine combination catalyst system. In the absence of tertiary amine catalyst a considerably longer rise time is observed than with the use of the combination system.

EXAMPLE 11

A foam was prepared on a continuous foaming machine by a recipe comprising the following ingredients:
 (a) 72.30 parts of polypropylene glycol having a molecular weight of 2050.
 (b) 25.02 parts of an 80:20 mixture of 2,4 and 2,6 tolylene diisocyanate.
 (c) 1.7 parts of water.
 (d) 0.4 part of an emulsifier.
 (e) 0.35 part of dibutyltin dilaurate.
 (f) 0.20 part of 1,4-diaza-bicyclo-[2,2,2]octane.

After curing the resulting foam had the following physical properties:

Density, lbs./cu. ft. _____ 2.76
Tensile strength, p.s.i. _____ 18.3
Compression set, percent _____ 4.6
Compression load at 25% deflection, p.s.i. _____ 0.64
Compression load at 50% deflection, p.s.i. _____ 0.72

EXAMPLE 12

A recipe was prepared comprising:
 (a) 75 grams of a polypropylene glycol having a molecular weight of 2010, and 75 grams of a reaction product of glycerol and propylene oxide having a molecular weight of 2990°.
 (b) 55.3 grams of an 0:20 mixture of 2,4 and 2,6 tolylene diisocyanate.
 (c) 4.0 grams of water.
 (d) 1.25 grams of an emulsifier.
 (e) 0.1 gram of 1,4-diaza-bicyclo-[2,2,2]octane.
 (f) 1.0 gram of tetrabutyltin.

The resulting foam had a density of 2.73 lbs./cu. ft.

EXAMPLE 13

A recipe was prepared comprising:
 (a) 75 grams of a polypropylene glycol having a molecular weight of 2010, and 75 grams of a reaction product of glycerol and propylene oxide having a molecular weight of 2990.
 (b) 55.3 grams of an 80:20 mixture of 2,4 and 2,6-tolylene diisocyanate.
 (c) 4.0 grams of water.
 (d) 1.25 grams of an emulsifier.
 (e) 0.1 gram of 1,4-diaza-bicyclo-[2,2,2]octane.
 (f) 1.0 gram bis(tributyltin) oxide.

The resulting foam cured well and had a density of 2.16 lbs./cu. ft.

EXAMPLE 14

A recipe was prepared comprising:
 (a) 75 grams of a polypropylene glycol having a molecular weight of 2010, and 75 grams of a reaction product of glycerol and propylene oxide having a molecular weight of 2990.
 (b) 55.3 grams of an 80:20 mixture of 2,4 and 2,6 tolylene diisocyanate.
 (c) 4.0 grams of water.
 (d) 1.25 grams of an emulsifier.
 (e) 0.1 gram of 1,4-diaza-bicyclo-[2,2,2]octane.
 (f) 1.0 gram of dibutyltin dibenzenesulfonamide.

The resulting foam had a density of 2.70 lbs./cu. ft.

EXAMPLE 15

A recipe was prepared comprising:
 (a) 75 grams of a polypropylene glycol having a molecular weight of 2010, and 75 grams of a reaction product of glycerol and propylene oxide having a molecular weight of 2990.
 (b) 55.3 grams of an 80:20 mixture of 2,4 and 2,6 tolylene diisocyanate.
 (c) 4.0 grams of water.
 (d) 1.25 grams of an emulsifier.
 (e) 0.1 gram of 1,4-diaza-bicyclo-[2,2,2]octane.
 (f) 1.0 gram of dimethyltin dichloride.

The resulting foam had a density of 2.10 lbs./cu. ft.

EXAMPLE 16

A recipe was prepared comprising:
 (a) 75 grams of a polypropylene glycol having a molecular weight of 2010, and 75 grams of a reaction product of glycerol and propylene oxide having a molecular weight of 2990.
 (b) 55.3 grams of an 80:20 mixture of 2,4 and 2.6 tolylene diisocyanate.
 (c) 4.0 grams of water.
 (d) 1.25 grams of an emulsifier.
 (e) 0.1 gram of 1,4-diaza-bicyclo-[2,2,2]octane.
 (f) 0.5 gram of tributyltin chloride.

The resulting foam had a density of 2.61 lbs./cu. ft.

EXAMPLE 17

A recipe was prepared comprising:
 (a) 75 grams of a polypropylene glycol having a molecular weight of 2010, and 75 grams of a reaction product of glycerol and propylene oxide having a molecular weight of 2990.
 (b) 55.3 grams of an 80:20 mixture of 2,4 and 2,6 tolylene diisocyanate.
 (c) 4.0 grams of water.
 (d) 1.25 grams of an emulsifier.
 (e) 0.1 gram of 1,4-diazo-bicyclo-[2,2,2]octane.
 (f) 0.5 gram of butyltin trichloride.

The resulting foam had a density of 2.02 lbs./cu. ft.

EXAMPLE 18

A recipe was prepared comprising:
 (a) 75 grams of a polypropylene glycol having a molecular weight of 2010, and 75 grams of a reaction product of glycerol and propylene oxide having a molecular weight of 2990.
 (b) 55.3 grams of an 80:20 mixture of 2,4 and 2,6 tolylene diisocyanate.
 (c) 4.0 grams of water.
 (d) 1.25 grams of an emulsifier.
 (e) 0.1 gram of 1,4-diaza-bicyclo-[2,2,2]octane.
 (f) 1.0 gram of tributyltin acetate.

The resulting foam had a density of 2.71 lbs./cu. ft.

What is claimed is:
1. Method which comprises reacting an organic compound containing a reactive —N=C=Y group in which Y is a member selected from the group consisting of oxygen and sulfur with a compound containing an active hydrogen atom as determined by the Zerewitinoff method in the presence of a catalytic amount of a catalyst composition comprising an organo tin compound having at least one direct carbon to tin bond and a tertiary amine; said compound containing an active hydrogen atom being free of tertiary amine groups.

2. Method which comprises reacting an organic isocyanate with an active hydrogen-containing compound as determined by the Zerewitinoff method in the presence of a catalytic amount of a catalyst composition comprising an organo tin compound having at least one direct carbon to tin bond and a tertiary amine; said compound containing an active hydrogen atom being free of tertiary amine groups.

3. Method which comprises reacting an organic isothiocyanate with an active hydrogen-containing compound as determined by the Zerewitinoff method in the presence of a catalytic amount of a catalyst composition comprising an organo tin compound having at least one direct carbon to tin bond and a tertiary amine; said compound containing an active hydrogen atom being free of tertiary amine groups.

4. Method which comprises reacting an aromatic isocyanate with an active hydrogen-containing compound as determined by the Zerewitinoff method in the presence of a catalytic amount of a catalyst composition comprising an organo tin compound having at least one direct carbon to tin bond and a tertiary amine; said compound containing an active hydrogen atom being free of tertiary amine groups.

5. Method which comprises reacting an aliphatic isocyanate with an active hydrogen-containing compound as determined by the Zerewitinoff method in the presence of a catalytic amount of a catalyst composition comprising an organo tin compound having at least one direct carbon to tin bond and a tertiary amine; said compound containing an active hydrogen atom being free of tertiary amine groups.

6. Method which comprises reacting an organic compound containing a reactive —N=C=Y group in which Y is a member selected from the group consisting of oxygen and sulfur with a compound containing an active hydrogen atom as determined by the Zerewitinoff method in the presence of a catalytic amount of a catalyst composition comprising an organo tin compound having at least one direct carbon to tin bond and a bond from the tin to a member selected from the group consisting of halogen, hydrogen, oxygen, sulfur, nitrogen and phosphorus and a tertiary amine; said compound containing an active hydrogen atom being free of tertiary amine groups.

7. Method which comprises reacting an organic compound containing a reactive —N=C=Y group in which Y is a member selected from the group consisting of oxygen and sulfur with a compound containing an active hydrogen atom as determined by the Zerewitinoff method in the presence of a catalytic amount of a catalyst composition comprising an organo tin compound having from one to three carbon bonds directly to a given tin atom and a bond from the tin to a member selected from the group consisting of halogen, hydrogen, oxygen, sulfur, nitrogen and phosphorus and a tertiary amine; said compound containing an active hydrogen atom being free of tertiary amine groups.

8. Method which comprises reacting a polyoxyalkylene polyol and an organic polyisocyanate in the presence of a catalytic amount of a catalyst composition comprising an organo tin compound having at least one direct carbon to tin bond and a tertiary amine; said compound containing an active hydrogen atom being free of tertiary amine groups.

9. Method which comprises reacting a polyester of a polyol and a polycarboxylic acid having groups containing active hydrogen atoms as determined by the Zerewitinoff method and an organic polyisocyanate in the presence of a catalytic amount of a catalyst composition comprising an organo tin compound having at least one direct carbon to tin bond and a tertiary amine; said compound containing an active hydrogen atom being free of tertiary amine groups.

10. Method which comprises reacting a methyl-epsilon-caprolactone-pentaerythritol polyester having a molecular weight of 6460 and toluene diisocyanate in the presence of a catalyst composition comprising dibutyltin oxide and N-methylmorpholine.

11. Method which comprises reacting an ethylene glycol-epsilon-caprolactone-ethylene oxide polyester ether having a molecular weight of 2200 and toluene diisocyanate in the presence of a catalyst composition comprising dibutyltin oxide and N-methylmorpholine.

12. Method which comprises reacting a mixture containing polypropylene glycol having a molecular weight of 1900 and a triol adduct of propylene oxide and 1,2,6-hexane-triol and toluene diisocyanate in the presence of a catalyst composition comprising dibutyltin dilaurate and triethylamine.

13. Method which comprises reacting a polypropylene glycol having a molecular weight of 2050 with tolylene diisocyanate in the presence of a catalyst composition comprising dibutyltin dilaurate and 1,4-diaza-bicyclo-[2,2,2]octane.

14. Method which comprises reacting a mixture comprising a polypropylene glycol having a molecular weight of 2010 and a triol adduct of propylene oxide started with glycerol having a molecular weight of 2990 with toluene diisocyanate in the presence of catalyst composition comprising bis(tributyltin) oxide and 1,4-diaza-bicyclo-[2,2,2]octane.

15. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising dibutyltin dibenzenesulfonamide and 1,4-bicyclo-[2,2,2]octane.

16. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising tributyltin chloride and 1,4-diaza-bicyclo-[2,2,2]octane.

17. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising butyltin trichloride and 1,4-diaza-bicyclo-[2,2,2]octane.

18. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising tributyltin acetate and 1,4-diaza-bicyclo-[2,2,2]octane.

19. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising dibutyltin dilaurate and triethylamine.

20. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising dibutyltin dilaurate and N,N-dimethylbenzylamine.

21. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising dibutyltin dilaurate and N,N,N',N'-tetramethyl-1,3-butanediamine.

22. Method which comprises reacting a mixture comprising a polypropylene glycol having a molecular weight of 2010 and a triol adduct of propylene oxide started with glycerol having a molecular weight of 2990 with toluene diisocyanate in the presence of a catalyst composition comprising dibutyltin diacetate and N,N,N',N'-tetramethyl-1,3-butanediamine.

23. In the preparation of a polyurethane plastic by a process which comprises reacting an organic compound containing groups which contain reactive hydrogen atoms as determined by the Zerewitinoff method with an organic polyisocyanate, the improvement which comprises adding to the reactants a catalytic amount of a tertiary amine catalyst and an organo-tin compound selected from the group consisting of dibutyl tin sulfide and dibutyl tin dibutoxide; said compound containing an active hydrogen atom being free of tertiary amine groups.

24. In the preparation of a polyurethane plastic by a process which comprises reacting an organic compound containing groups which contain reactive hydrogen atoms as determined by the Zerewitinoff method with an organic polyisocyanate, the improvement which comprises adding to the reactants a catalytic amount of a tertiary amine catalyst and an organo tin compound having at least one direct alkyl group to tin bond; said compound containing an active hydrogen atom being free of tertiary amine groups.

References Cited

UNITED STATES PATENTS

| | | | |
|---|---|---|---|
| 2,901,445 | 8/1959 | Harris | 260—2.5 |
| 2,939,851 | 6/1960 | Orchin | 260—2.5 |
| 2,949,431 | 8/1960 | Britain | 260—2.5 |
| 3,194,773 | 7/1965 | Hostettler | 260—2.5 |
| 3,392,128 | 7/1968 | Hostettler et al. | 260—22 |
| 3,392,153 | 7/1968 | Hostettler et al. | 260—77.5 |

FOREIGN PATENTS

| | | | |
|---|---|---|---|
| 769,681 | 3/1957 | Great Britain | 260—2.5 |

OTHER REFERENCES

Barringer: "Rigid Urethane Foams—11 Chemistry and Formulation," Du Pont Elastomers Chem. Dept., Bull. HR–26; April 1958, pp. 7 and 8.

Saunders et al., "Chemical Reviews," 1948; vol. 43, pp. 203–218.

Mobay Publication, "A One Shot System for Flexible Polyether Urethane Foams," pp. 1 to 4; Nov. 10, 1958.

DONALD E. CZAJA, Primary Examiner

D. J. BARRACK, Assistant Examiner

U.S. Cl. X.R.

260—18, 22, 75, 77.5